(12) United States Patent
Silver et al.

(10) Patent No.: US 8,083,596 B1
(45) Date of Patent: Dec. 27, 2011

(54) TORQUE LIMITER

(75) Inventors: William J. Silver, Grafton, MA (US); Merle Johnston, Taunton, MA (US)

(73) Assignee: Holmed Corporation, South Easton, MA (US)

( * ) Notice: Subject to any disclaimer, the term of this patent is extended or adjusted under 35 U.S.C. 154(b) by 519 days.

(21) Appl. No.: 11/945,014

(22) Filed: Nov. 26, 2007

(51) Int. Cl.
*F16D 9/02* (2006.01)
(52) U.S. Cl. ............................................. 464/31; 464/37
(58) Field of Classification Search ............ 464/31, 464/34, 37, 903; 433/105
See application file for complete search history.

(56) References Cited

U.S. PATENT DOCUMENTS

| | | | | |
|---|---|---|---|---|
| 3,067,597 | A | * | 12/1962 | Sauerbrey ........................ 464/37 |
| 3,932,956 | A | * | 1/1976 | Young .......................... 464/37 X |
| 3,984,997 | A | | 10/1976 | Dossier |
| 3,991,590 | A | * | 11/1976 | Brems et al. .................... 464/37 |
| 4,291,553 | A | | 9/1981 | Kato et al. |
| 4,311,224 | A | | 1/1982 | Kato et al. |
| 4,668,206 | A | | 5/1987 | Fukumoto |
| 4,792,321 | A | | 12/1988 | Lundquist |
| 5,057,119 | A | * | 10/1991 | Clark et al. .................. 464/37 X |
| 5,234,089 | A | | 8/1993 | Itomi et al. |
| 6,132,435 | A | | 10/2000 | Young |
| 6,168,402 | B1 | * | 1/2001 | Kawada ....................... 464/37 X |
| 6,807,885 | B2 | | 10/2004 | Loper |
| 2004/0166473 | A1 | | 8/2004 | Cohen |
| 2005/0282640 | A1 | | 12/2005 | Takada et al. |

FOREIGN PATENT DOCUMENTS

SU 1493820 A1 * 7/1989 ........................ 464/37

* cited by examiner

*Primary Examiner* — Gregory Binda
(74) *Attorney, Agent, or Firm* — Cesari and McKenna, LLP

(57) ABSTRACT

In one embodiment, a torque limiter comprises an outer cylindrical housing having a plurality of semicircular grooves disposed in an interior surface. An inner cylindrical housing is arranged at least partially within the outer cylindrical housing. The inner cylindrical housing has a plurality of slots passing from its interior surface to its exterior surface. A plurality of roller bearings are disposed within the slots. An elastic cylinder is also arranged within the interior of the inner cylindrical housing. When applied torque is below a torque limit, the elastic component presses the roller bearings into contact with the semicircular grooves to couple the outer and inner cylindrical housing. In response to applied torque exceeding the torque limit, the elastic component compresses sufficiently to allow the roller bearings to retract and disengage the semicircular grooves, thereby decoupling the outer and the inner cylindrical housings and preventing the transfer of torque.

15 Claims, 4 Drawing Sheets

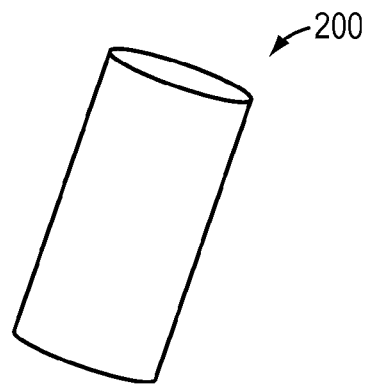
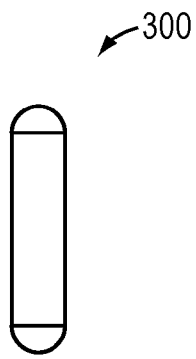
FIG. 2　　　　　　　FIG. 3
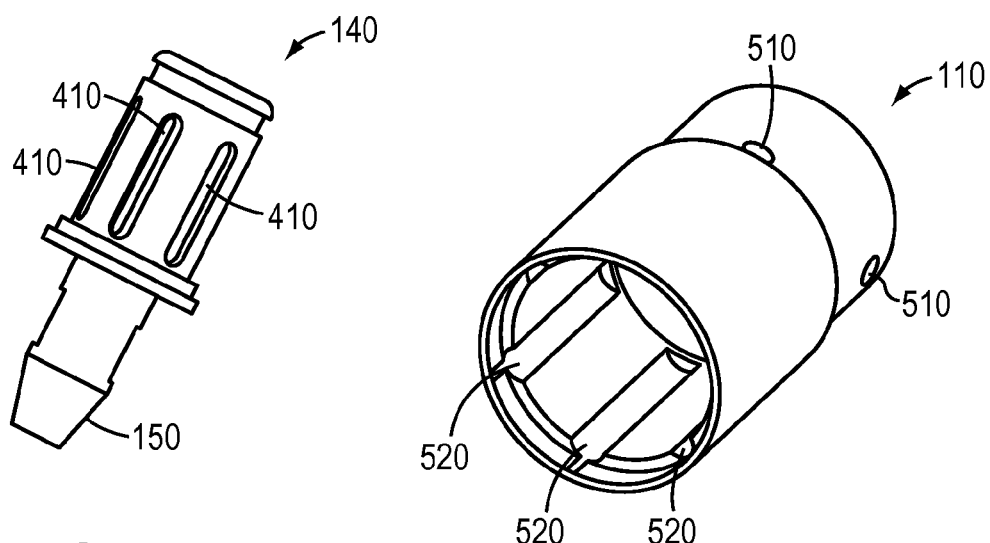
FIG. 4　　　　　　　FIG. 5

TORQUE LIMITER

BACKGROUND

1. Technical Field

The present disclosure relates generally to torque limiters and more specifically to a torque limiter suitable for use in surgical procedures.

2. Background Information

It is increasingly common for a surgeon or other medical practitioner to insert fasteners into the human body to promote proper healing. For example, orthopedists often treat a variety of different types of bone fractures and other skeletal conditions by installing bone screws, rod and cap screws, or other fasteners in the affected area, to stabilize the bone, to secure implants, or for other therapeutic purposes. Bone screws or other fasteners may require predrilled and tapped holes, or may be self-drilling and self-tapping. When installing a screw or other fastener into bone, it is important that the bone not be subject to excessive torque. Excessive torque may "strip" threads in the bone, or may otherwise damage the bone. Further excessive torque may damage screws or other fasteners, for example by stripping the head of a fastener made from a delicate bioabsorbable material. Thus, applying a limited amount of torque is important in the surgical setting.

A variety of different type of torque limiters exist that are commonly used in other fields to limit torque applied by a driving device, for example a manual tool or a power tool, to a load. Existing torque limiters may be broadly classified into two types: disconnect types that uncouple the driving device from the load, such that little or no residual torque makes its way to the load once a particular torque limit is reached, and torque reduction types which slip (i.e. let a drive component rotate at a different rate from the load) such that, while some torque is still applied to the load, it does not exceed the torque limit.

Disconnect torque limiters may be further classified into a variety of subtypes. One subtype, shear torque limiters, operate by sacrificing a shear-pin, shear-ring or other mechanical component when the torque limit is reached, breakage of the component disconnecting a driving device from the load. Another subtype, ball detent torque limiters, operate by transmitting force through hardened balls which rest in detents. The balls are often held in place by springs. When the torque limit is reached, the balls are pushed out of their detents, disconnecting the driving device from the load. The balls are often retained in a secondary non-load bearing position until they are manually reset into the detents. Yet another subtype, pawl and spring torque limiters, operate by using a spring to hold a drive pawl against a notch in a rotor. When the torque limit is reached, the drive pawl disengages from the notch, thereby disconnecting a driving device from the load.

Torque reduction torque limiters may be also classified into a variety of subtypes. The most common subtype, friction torque limiters, include two friction plates or other friction elements that are compressed and grip against one another. The limit of the torque applied is a result of the coefficient of friction between the plates. If excessive torque is applied, the plates simply begin to slip.

While existing torque limiters may be acceptable for certain applications, they are poorly suited for use in surgical procedures, such as installing screws or other fasteners into bone. Many existing torque limiters are not resilient to certain sterilization techniques. For example some existing torque limiters require, or operate best with, lubricating oils that degrade at high temperatures. Thus, such torque limiters are often incompatible with autoclaves, which typically use high-temperature steam to sterilize surgical instruments. Other designs may not be compatible with ethylene oxide (ETO) and/or Gamma sterilization. Many existing torque limiters are also quite complicated. Such complexity may lead to unacceptable size and weight characteristics, increased occurrence of failures and malfunctions, and high costs. Indeed, many existing torque limiters are quite unsuited for single-use applications given their complexity and resultant cost. Finally, many existing torque limiters are not as accurate and precise as desired at the low torque levels commonly used in surgical procedures.

Accordingly, there is a need for an improved torque limiter suitable for use in surgical procedures that overcomes the shortcomings of prior designs.

SUMMARY

The shortcomings of the prior art are addressed in part by a novel torque limiter that employs an elastic component, for example a component made from an elastic polymer, in limiting torque.

In an illustrative embodiment, the torque limiter includes a shaft at one end that may be attached to a hand tool or a power tool, and an adaptor at the other end that may be attached to a bit or other torque delivery implement. The shaft is attached to an outer cylindrical housing that is configured to at least partially surround an inner cylindrical housing. The inner cylindrical housing is affixed to the adaptor. The outer cylindrical housing has a number of semicircular grooves formed therein, while the inner cylindrical housing has a corresponding number of slots extending from its inner surface to its outer surface. Roller bearings are disposed within the slots in the inner cylindrical housing and pressed into the semicircular grooves of the outer cylindrical housing by an elastic cylinder disposed within the hollow interior of the inner cylindrical housing. The elastic cylinder may be a solid cylinder made of an elastic polymer, such as silicone rubber.

When torque is applied to the outer cylindrical housing, the roller bearings are forced against the elastic cylinder. At low torque levels, the elastic cylinder is sufficiently resilient such that, while the roller bearings may retract somewhat, they still remain in contact with the semicircular grooves. As such, the roller bearings couple the outer cylindrical housing to the inner cylindrical housing, allowing torque to be transferred therebetween. However, if the torque applied to the outer cylindrical housing exceeds a torque limit, the elastic cylinder will compress further and allow the roller bearings to fully retract into the inner cylindrical housing. When in this state, the semicircular grooves lose contact with the roller bearings and the outer cylindrical housing is decoupled from the inner cylindrical housing, and may rotate freely. This free rotation essentially prevents torque from being transmitted to the inner cylindrical housing, and thus any load attached thereto.

When the outer cylindrical housing rotates to a position where the semicircular grooves are again aligned with the roller bearings, the elastic cylinder forces the roller bearings back into the semicircular grooves. Depending on the torque then incident, the elastic cylinder may be recompressed, such that the roller bearings again retract and the housings move independently, or the roller bearings may remain in sufficient contact with the semicircular grooves, such that they couple the inner and outer cylindrical housings together and torque may be transmitted therebetween.

The torque limit at which the inner and outer cylindrical housings decouple is a function of at least the hardness of the elastic cylinder, the number, diameter and length of the roller bearings, and the size of the cylindrical housings. These properties may be selected during manufacture, or in some cases adjusted subsequent thereto, to achieve differing torque limits.

Further, by appropriately selecting the materials used to construct the torque limiter, the torque limiter may be implemented as a single-use disposable device, or as a reusable device. A disposable implementation may be constructed from materials that withstand ethylene oxide (ETO) and/or Gamma sterilization, but substantially deteriorate if exposed to high-temperature steam used in autoclaves. Such deterioration may discourage inadvertent, unpermitted or otherwise unwanted repeated use. Further, a reusable implementation may be constructed of materials that can withstand a variety of types of sterilization, including ETO, Gamma, and high temperature steam.

BRIEF DESCRIPTION OF THE DRAWINGS

The description below refers to the accompanying drawings, of which:

FIG. 2 is a perspective view of elastic cylinder employed in the example torque limiter;

FIG. 3 is a view of an example roller bearing employed in the example torque limiter;

FIG. 4 is a perspective view of an inner housing employed in the example torque limiter;

FIG. 5 is a perspective view of an outer housing employed in the example torque limiter;

DETAILED DESCRIPTION OF AN ILLUSTRATIVE EMBODIMENT

Figure 1:
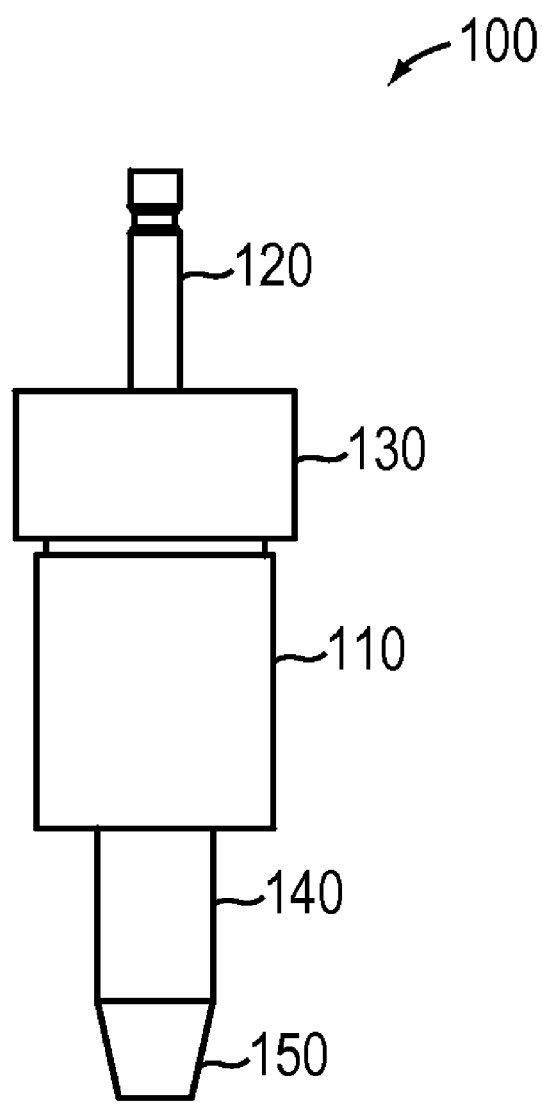
FIG. 1 is a side elevation of an example torque limiter according to an illustrative embodiment of the present disclosure.

As shown in FIG. 1, an example torque limiter 100 according to an illustrative embodiment of the present disclosure includes an outer cylindrical housing 110 to which torque is applied via a shaft 120 affixed thereto by a coupling 130. The shaft 120 may be attached to a hand tool (not shown), for example to a ratcheting or non-ratcheting driver, or to a power tool (not shown), for example an electric or pneumatic drill, which is used to generate torque.

An inner cylindrical housing 140 (only partially visible in FIG. 1) is disposed within the outer cylindrical housing 110. The inner cylindrical housing 140 is affixed to an adaptor 150 which may be coupled to a bit (not shown) or other implement for delivering torque to a load, for example a screw or other fastener. The adaptor 150 may be a standard adaptor, for example, an AO pull adaptor, an AO push adaptor, a ¼ inch square adaptor, a small Zimmer adaptor, a Hudson adaptor, a standard Zimmer adaptor, ¼ inch square quick connect adaptor, or another type of adaptor.

As shown in FIGS. 2-4 the outer cylindrical housing 110, the inner cylindrical housing 140, a roller bearing 300, and an elastic cylinder 200 together form the primary components of the example torque limiter 100. The outer cylindrical housing 110 may have a number of connection points 510 disposed at a proximal end of its exterior surface. These connection points 510 may be configured to receive spring-loaded pins (not shown) of the coupling 130, to secure the coupling 130 to the outer cylindrical housing 110.

Proximate to the distal end of the outer cylindrical housing 110, formed into its interior surface, are a number of axially aligned semicircular grooves 520. The semicircular grooves 520 extend partially into the thickness of the outer cylindrical housing 110. In the illustrative embodiment, six semicircular grooves 520 are employed, three of which are visible in FIG. 5. However, depending on the particular implementation, a differing number of semicircular groves 520 may be used. A corresponding number of slots 410 are formed in the inner cylindrical housing 140. The slots 410 extending from the outer surface of the inner cylindrical housing 140 to its inner surface. Three slots 410, of the six employed in the illustrative embodiment, are visible in FIG. 4. The semicircular grooves 520 and slots 410 are configured to align when a distal portion of the inner cylindrical housing 140 is placed within a proximal portion of the outer cylindrical housing 110.

Each semicircular groove 520 and slot 410 is sized to accommodate a roller bearing 300. The slots 410 are sized to permit the roller bearings 300 to freely pass through, from the hollow interior of the inner cylindrical housing 140 to its exterior, while retaining the roller bearings 300 from significant movement in other directions.

In the illustrative embodiment, the torque limiter is intended as a single-use disposable device. In such an embodiment, the outer cylindrical housing 110, the inner cylindrical housing 140, and/or the roller bearings 300 may be constructed in from a plastic, specifically a medical grade plastic such as acrylonitrile butadiene styrene (ABS), which tolerates ethylene oxide (ETO) and/or gamma sterilization, but degrades when exposed to elevated temperatures found in autoclaves. Such degradation may desirably discourage inadvertent reuse of the torque limiter 100 by medical personnel, who commonly sterilize instruments between uses by subjecting them to high-temperature steam in an autoclave.

In an alternate embodiment, the torque limiter may be implemented as a reusable device. In a reusable implementation, the outer cylindrical housing 110, the inner cylindrical housing 140, and/or the roller bearings 300 may be constructed from a heat resistant type of plastic, for example polycarbonate, Radel® polyphenylsulfone available from Amoco Performance Products, Inc., or Ultem® polyetherimide available from General Electric, from a metal, such as stainless steel, or from some other type of material, or a combination of several types of materials, that can withstand the high temperatures of autoclaving.

An elastic cylinder 200 is sized to fit within the hollow interior of the inner cylindrical housing 140, and to be substantially in contact with the inner surface of the inner cylindrical housing 140 when disposed within it. In the illustrative embodiment, the elastic cylinder 200 is constructed substantially from an elastic polymer, specifically silicone rubber. The silicone rubber may be a type that is stable to ETO and gamma sterilization but unstable to steam heat. Alternately, the elastic cylinder 200 may be constructed from another material having elastic properties, for example from another elastomer such as a highly resilient silicone rubber or polyester, from a highly elastic metal, such as Liquidmetal® zirconium-based alloy, available from Liquidmetal Technologies of Rancho Santa Margarita, Calif., or from a combination of several materials that are stable in steam heat.

Figure 6:
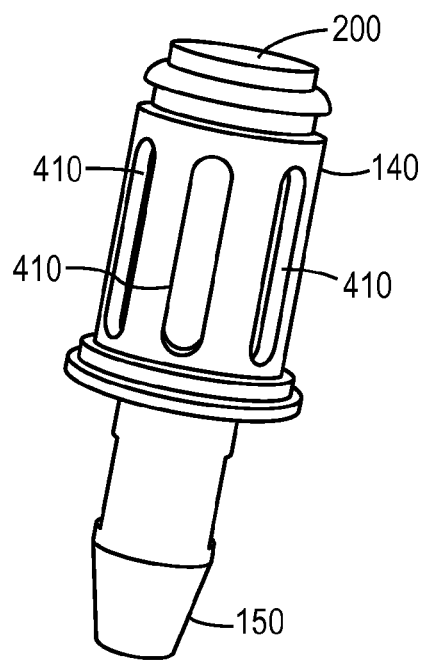
FIG. 6 is a perspective view that illustrates a first step of an assembly sequence of the example torque limiter.
Figure 7:
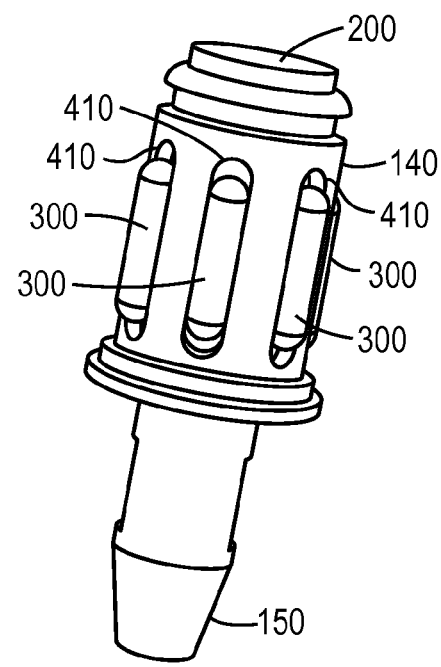
FIG. 7 is a perspective view that illustrates a second step of an assembly sequence of the example torque limiter.
Figure 8:
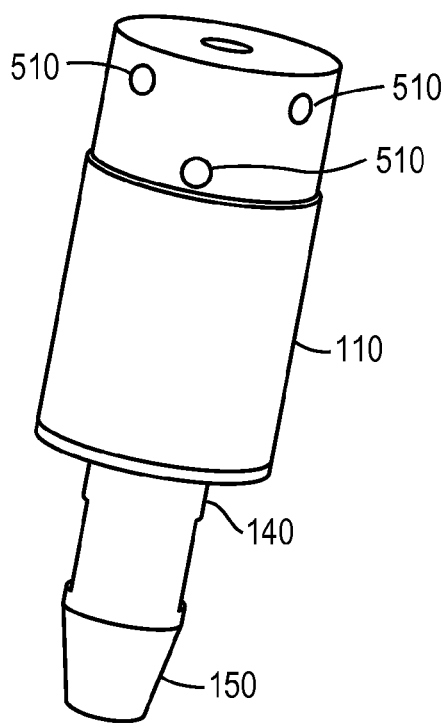
FIG. 8 is a perspective view that illustrates a third step of an assembly sequence of the example torque limiter.

As shown in FIGS. 6-8 the example torque limiter 100 may be assembled by first placing the elastic cylinder 200 within the hollow interior of the inner cylindrical housing 140. Second, one places the roller bearings 300 within the slots 410 in the inner cylindrical housing 140. Finally, one slides the outer cylindrical housing 110 over the inner cylindrical housing 140 and the roller bearings 300. The outer cylindrical housing 110 may be held in place by a snap-fit connections, by one or more fasteners, or by other means.

Figure 9:
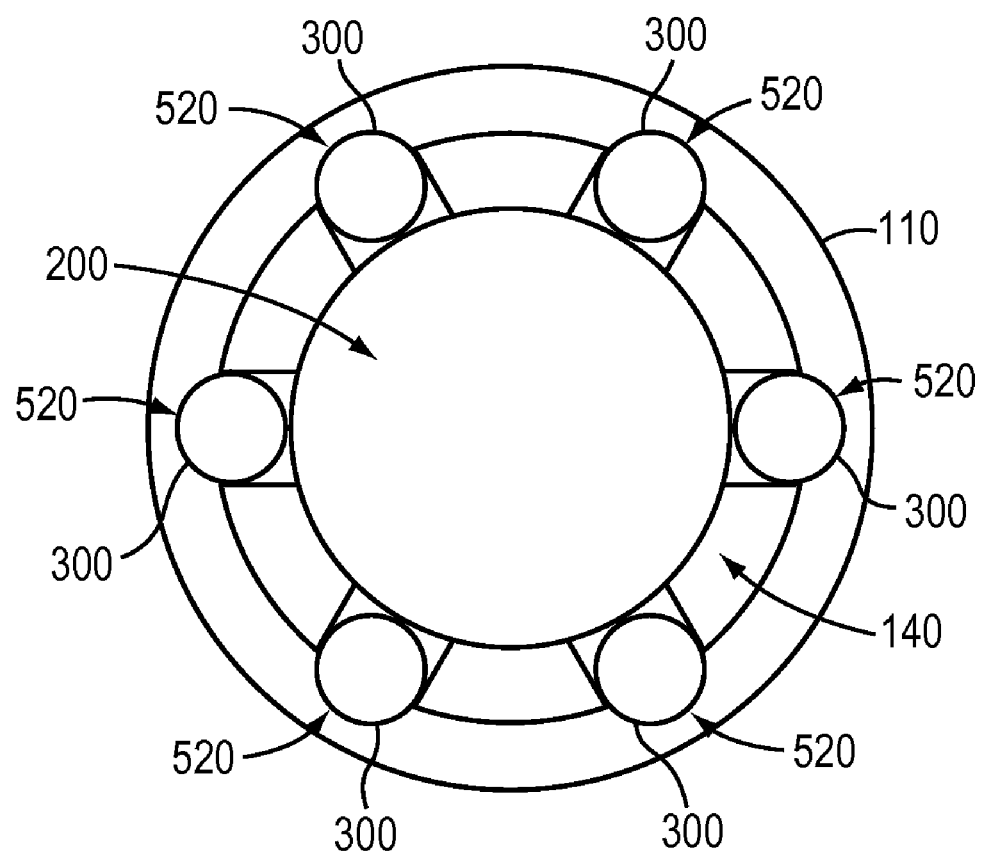
FIG. 9 is a cross section view of an assembled example torque limiter.

In reference to FIG. 9, when the example torque limiter 100 is assembled, the roller bearings 300 are disposed in the slots 410 in the inner cylindrical housing 140 and pressed into contact with the semicircular grooves 520 of the outer cylindrical housing 140 by the elastic cylinder 200. When torque is applied to the outer cylindrical housing 110, the roller bearings 300 are forced against the elastic cylinder 200 by the semicircular grooves 520. This force causes the roller bearings 300 to compress the elastic cylinder 200. At low torque levels, the elastic cylinder 200 is sufficiently resilient such that, while the roller bearings 300 may retract somewhat, they still remain in contact with the semicircular grooves 520. As such, the roller bearings 300 couple the outer cylindrical housing 110 to the inner cylindrical housing 140, allowing force to be transmitted therebetween. Thus torque applied to the outer housing is transmitted to a load coupled to the inner housing 140.

However, if the torque applied to the outer cylindrical housing 110 exceeds a torque limit, the elastic cylinder 200 will compress further and allow the roller bearings 300 to fully retract into the inner cylindrical housing 140, such that the roller bearings 300 are fully disposed within the diameter of the outer surface of the inner cylindrical housing 140. When in this state, the semicircular grooves 520 lose contact with the roller bearings 300 and the outer cylindrical housing 110 is decoupled from the inner cylindrical housing 110, and may rotate freely. This free rotation prevents significant torque from being transmitted to the inner cylindrical housing 140 and, in turn to the load. While a very small amount of torque may be transferred due to friction between the two housings 110,140, this torque is typically negligible.

When the outer cylindrical housing 110 rotates to a position where the semicircular grooves 520 are again aligned with roller bearings 300, the outer cylindrical housing 110 and the inner cylindrical housing 140 may recouple depending on the torque incident at that moment. That is, the elastic cylinder 200 will attempt to force the roller bearings 300 back into the semicircular grooves 520, as the elastic cylinder 200 tries to return to its original shape. Depending on the forces then incident, the roller bearings 300 may remain in contact with the semicircular grooves 520 or may again retract into the inner housing 140.

The torque limit at which the inner and outer cylindrical housings 110, 140 decouple may be selected by varying parameters of the torque limiter 100. Certain of these parameters may be varied by the manufacturer, while others may be changed either by the manufacturer, in a before-shipping configuration procedure, or even by an end user.

For example, the torque limit is a function of the hardness of the elastic cylinder 200. In the illustrative embodiment, the elastic cylinder 200 is selected to have a hardness of between 30 and 80 Shore A when subject to a durometer. Such hardnesses have been found to yield torque limits in the range of 0.4 Nm to 10 Nm, suitable torque limits for use with bone screws or other fasteners employed in surgical procedures. The torque limiter 100 may be configured to have a particular hardness elastic cylinder 200 preinstalled, or may be supplied with a number of different hardness elastic cylinders that may be inserted by an end-user depending on the particular torque limit desired.

Further, the torque limit is a function of the number, diameter and length of the roller bearings 300. In the illustrative embodiment, six roller bearings, having a diameter of 0.156 inches and a length of 0.625 inches are employed. These parameters may be varied during manufacture by physically altering the components. To some extent they may also be manipulated after. For example, while in the illustrative embodiment the torque limiter has semicircular grooves 520 and slots 410 to accommodate six roller bearings, each need not be filled. For instance only 4 roller bearings 300 may be used, and the other semicircular grooves 520 and slots 410 left vacant, effectively lowering the torque limit of the device. Such a modification may be made during a configuration procedure before delivery of the torque limiter, or even by the end-user. For example, a chart may be supplied with the torque limiter 100 correlating a number of roller bearings 300 used with a torque limit achieved, and an end-user may configure their device as desired.

Similarly, while in the illustrative embodiment the torque limiter has semicircular grooves 520 and slots 410 sufficiently long to accommodate roller bearings of 1.00 inches, shorter roller bearings 300 may be employed to yield a decreased torque limit. Such modification may be made during a configuration procedure before delivery of the torque limiter, or even by the end-user if a number of differently sized roller bearings 300 are supplied therewith.

Further, the torque limit is a function of the size of the housings 110,140, in particular the inner diameter of the inner cylindrical housing 140. In the illustrative embodiment, the inner cylindrical housing 140 is selected to have a diameter of 0.480 inches and the other components sized appropriately in relation thereto. However, to achieve differing torques this dimension may be selected differently.

While the above description discusses an illustrative embodiment of present disclosure, it should be apparent that a number of modifications and/or additions may be made without departing from the disclosure's intended spirit and scope.

Rather than include a shaft 120 coupled to the outer cylindrical housing 110 and an adaptor 150 affixed to the inner cylindrical housing 140, alternate configurations may not employ a shaft 120 or an adaptor 150. For example, the outer cylindrical housing 110 may be directly coupled to a handle (not shown), for example, a molded palm handle, a T-handle or other type of handle. Alternately, the torque limiter 100 may be integrated into a power tool and the outer cylindrical housing directly couple to internal components of the power tool. Similarly, the inner cylindrical housing 140 may be directly coupled to a bit or other torque delivery implement, or some other component. Thus, a variety of differing configurations are expressly contemplated.

Further, while in the above description torque is applied to the outer cylindrical housing 110 and delivered to a load through an adapter 150 affixed to the inner cylindrical housing 140, such arrangement may be reversed. For example, an adaptor 150 or other structured may be affixed to the outer housing 110 and the torque applied to the inner housing 140.

Further, the above description is not only applicable to relatively low torque application, for example those where a torque limit of about 0.4 Nm to 10 Nm is desired. The teachings herein may be used to achieve quite substantial torque limits by differently selecting materials, dimensions and other parameters. For example, an all-metal implementation employing an elastic cylinder 200 having a high Shore A hardness, may provide a more-substantial torque limit.

Further, the above description is not only applicable to torque limiters for use in surgical applications. The teachings herein may be readily applied to torque limiters employed in a variety of other fields.

Accordingly, it should be understood that the above descriptions are meant to be taken only by way of example.

What is claimed is:

1. A torque limiter comprising:
an outer cylindrical housing having a plurality of semicircular grooves disposed in an interior surface thereof, the outer cylindrical housing configured to receive applied torque;
an inner cylindrical housing having a plurality of slots passing from an interior surface to an exterior surface thereof, the inner cylindrical housing arranged at least partially within of the outer cylindrical housing, the inner cylindrical housing coupled to an adaptor configured to deliver torque to a fastener disposed within a human body;
a plurality of roller bearings, each roller bearing disposed within a slot in the inner cylindrical housing;
an elastic cylinder arranged within the inner cylindrical housing, the elastic cylinder configured to, when applied torque is below a torque limit, press the roller bearings into contact with the semicircular grooves to couple the outer cylindrical housing and the inner cylindrical housing to permit applied torque to transfer therebetween and be delivered via the adaptor to the fastener disposed within the human body; and
the elastic cylinder further configured to, in response to applied torque exceeding the torque limit, compress to allow the roller bearings to retract sufficiently into the inner cylindrical housing that they disengage the semicircular grooves to decouple the outer cylindrical housing from the inner cylindrical housing and to substantially prevent transfer of torque therebetween to prevent delivery of excess torque to the fastener disposed within the human body,
wherein the torque limiter is a single-use disposable product, where at least one of the inner cylindrical housing, the outer cylindrical housing, the roller bearings or another component of the torque limiter is constructed from a non-heat resistant material that substantially deteriorates in response to autoclaving.

2. The torque limiter of claim 1 wherein the elastic cylinder is constructed substantially from an elastic polymer.

3. The torque limiter of claim 2 wherein the elastic polymer is silicone rubber.

4. The torque limiter of claim 1 wherein the non-heat resistant material comprises acrylonitrile butadiene styrene (ABS).

5. The torque limiter of claim 1 wherein at least one of the inner cylindrical housing, the outer cylindrical housing, or the roller bearings is constructed from a heat-resistant material that withstands autoclaving without substantially deterioration.

6. The torque limiter of claim 5 wherein the resistant material comprises polycarbonate.

7. The torque limiter of claim 1 further comprising:
a shaft coupled to the outer cylindrical housing, the shaft configured to pass torque to the outer cylindrical housing.

8. A torque limiter comprising:
an outer housing having a plurality of grooves disposed in an interior surface thereof;
an inner housing arranged at least partially within of the outer housing;
an adaptor configured to deliver torque to a fastener disposed within a human body;
a plurality of bearings arranged within spaces in the inner housing;
an elastic polymer in contact with the bearings, the elastic polymer configured to, when applied torque is below a torque limit, press the bearings into contact with the grooves to couple the outer housing and the inner housing to permit torque to transfer therebetween and be delivered via the adaptor to the fastener disposed within the human body; and
the elastic polymer further configured to, in response to applied torque exceeding the torque limit, allow the bearings to disengage the grooves to decouple the outer housing from the inner housing to substantially prevent transfer of torque therebetween to prevent delivery of excess torque to the fastener disposed within the human body,
wherein the elastic polymer is substantially silicone rubber.

9. The torque limiter of claim 8 wherein the torque limiter is a single-use disposable product.

10. The torque limiter of claim 8 wherein the torque limiter is a reusable product.

11. The torque limiter of claim 10 wherein at least one of the inner housing, the outer housing, or the bearings is constructed from a heat-resistant material that withstands autoclaving without substantially deterioration.

12. A torque limiter comprising:
an outer housing having a plurality of grooves disposed in an interior surface thereof;
an inner housing arranged at least partially within of the outer housing;
an adaptor configured to deliver torque to a fastener disposed within a human body;
a plurality of bearings arranged within spaces in the inner housing;
an elastic polymer in contact with the bearings, the elastic polymer configured to, when applied torque is below a torque limit, press the bearings into contact with the grooves to couple the outer housing and the inner housing to permit torque to transfer therebetween and be delivered via the adaptor to the fastener disposed within the human body; and
the elastic polymer further configured to, in response to applied torque exceeding the torque limit, allow the bearings to disengage the grooves to decouple the outer housing from the inner housing to substantially prevent transfer of torque therebetween to prevent delivery of excess torque to the fastener disposed within the human body,
wherein the torque limiter is a single-use disposable product, where at least one of the inner housing, the outer housing, the bearings or another component of the torque limiter is constructed from a non-heat resistant material that substantially deteriorates in response to autoclaving.

13. The torque limiter of claim 12 wherein the non-heat resistant material comprises acrylonitrile butadiene styrene (ABS).

14. The torque limiter of claim 12 wherein the outer housing is configured to receive applied torque and the inner housing is configured to deliver torque to the adaptor.

15. A torque limiter comprising:
an outer housing having a plurality of grooves disposed in an interior surface thereof;
an inner housing arranged at least partially within of the outer housing;
an adaptor configured to deliver torque to a fastener disposed within a human body;

a plurality of bearings arranged within spaces in the inner housing;

an elastic polymer in contact with the bearings, the elastic polymer configured to, when applied torque is below a torque limit, press the bearings into contact with the grooves to couple the outer housing and the inner housing to permit torque to transfer therebetween and be delivered via the adaptor to the fastener disposed within the human body; and the elastic polymer further configured to, in response to applied torque exceeding the torque limit, allow the bearings to disengage the grooves to decouple the outer housing from the inner housing to substantially prevent transfer of torque therebetween to prevent delivery of excess torque to the fastener disposed within the human body, wherein the torque limiter is a reusable product and at least one of the inner housing, the outer housing, or the bearings is constructed from a heat-resistant material that withstands autoclaving without substantially deterioration, and the heat-resistant material comprises polycarbonate.

\* \* \* \* \*